United States Patent [19]

Tamakoshi

[11] Patent Number: 5,499,152
[45] Date of Patent: Mar. 12, 1996

[54] PROTECTION CIRCUIT

[75] Inventor: Akira Tamakoshi, Tokyo, Japan

[73] Assignee: NEC Corporation, Tokyo, Japan

[21] Appl. No.: 453,810

[22] Filed: May 30, 1995

Related U.S. Application Data

[63] Continuation of Ser. No. 47,575, Apr. 13, 1993, abandoned.

[30] Foreign Application Priority Data

Apr. 15, 1992 [JP] Japan ..................... 4-121356

[51] Int. Cl.$^6$ .................................. H02H 3/20
[52] U.S. Cl. ................. 361/56; 361/111; 361/91; 257/355
[58] Field of Search ................. 361/56, 91, 111; 257/355, 356, 357, 358, 363, 361, 362

[56] References Cited

U.S. PATENT DOCUMENTS

| | | | |
|---|---|---|---|
| 4,739,438 | 4/1988 | Sato | 361/91 |
| 4,937,700 | 6/1990 | Iwahashi | 361/91 |
| 5,086,365 | 2/1992 | Lien | 361/58 |
| 5,121,179 | 6/1992 | Sasaki | 257/358 |

*Primary Examiner*—A. D. Pellinen
*Assistant Examiner*—Sally C. Medley

[57] ABSTRACT

Independently of a punch-through MOS transistor $Q_3$ used as an I/O protection element in which the drain is connected to an input node or output node and the source is connected to a GND or Vcc, an element for-setting the gate of punch-through MOS transistor $Q_3$ to the GND potential is provided so that its operating speed may be slower than the punch-through speed of the punch-through MOS transistor $Q_3$. In consequence, a high surge applied from I/O terminal can be punched through before the gate insulating film of the punch-through transistor $Q_3$ undergoes a high electric field, to thereby protect the gate insulating film.

3 Claims, 3 Drawing Sheets

PROTECTION CIRCUIT

This is a continuation of Ser. No. 047,575 filed Apr. 12, 1993 now abandoned.

FIELD OF THE INVENTION

The present invention relates to an input/output protection circuit for use in a semiconductor integrated circuit.

BACKGROUND OF THE INVENTION

In a conventional integrated circuit, as illustrated in FIG. 1, an output circuit emits signals IN1, IN2 from the internal circuit via an output line 1 to an output pad $P_1$, the line 1 being typically made of a metal such as an aluminum or the like of low resistance in order to increase the emitting speed more or less. If a high surge caused by an ESD (Electrostatic Discharge) or the like is applied to this output circuit from the exterior, then the surge is applied to an N-channel transistor $Q_1$ or $Q_2$ from the output pad $P_1$ through the line 1 without being most alleviated, to cause a punch-through to be emitted to the power supply (Vcc) or ground (GND).

Transistors $Q_1$, $Q_2$ are designed greater than the ordinary transistors within the internal circuit in order to alleviate the concentration of the electric field during the punch-through as well as to increase the output speed during the normal operation.

In this conventional output circuit, in view of the operating characteristics, the size of the transistor $Q_2$ is often made smaller. In such a case, when the high surge is applied, the concentration of the electric field often causes the transistor $Q_2$ to be broken down. In order to prevent this, conventionally, independently of the transistor $Q_2$, a punch-through transistor $Q_3$ whose source and gate are connected to the GND and whose drain is connected to the output line 1 respectively is provided to protect the transistor $Q_2$, as shown in FIG. 1.

However, in this arrangement, if the high surge is instantaneously applied between the output pad $P_1$, and the GND, since a voltage is directly applied between the drain and the gate of the transistor $Q_3$, the gate insulating film of the transistor $Q_3$ can be destroyed.

For an input circuit, since the surge applied to the input pad is alleviated to some degree by a protection resistor while it reaches the punch-through transistor, it does not suffer such an intensive electric field as the gate insulating film of the punch-through transistor of the output circuit, but there also exists a danger of being destroyed.

SUMMARY OF THE INVENTION

An object of the present invention is to provide a protection circuit which allows the gate insulating film of the punch-through transistor used as an input/output protection element to be protected from the danger of breakdown by the high surge caused by ESD or the like.

In order to achieve the foregoing end, a protection circuit according to the present invention comprises an input/output (I/O) line, a punch-through MOS transistor and a grounding element. For the punch-through MOS transistor, its drain is connected to the I/O line, and its source is connected to the ground potential or power supply potential. The foregoing grounding element is adapted for setting the gate of the punch-through MOS transistor to the ground potential, and its operating speed is set lower than the punch-through speed of the punch-through MOS transistor.

For the foregoing grounding element, one comprising a MOS transistor, the gate of which is connected to the power supply potential and the source of which to the ground potential and the drain of which to the gate of the punch-through MOS transistor, can be used.

Further, for the foregoing grounding element, one comprising a resistor having a proper time constant, can be used.

Further, for the foregoing grounding element, one comprising a MOS transistor and a resistor having a proper time constant can be used, the gate of the MOS transistor being connected to the power supply potential and the source of the same to the ground potential and the drain of the same being connected to the gate of the punch-through transistor, the resistor being interposed between the drain of the MOS transistor and the gate of the punch-through MOS transistor, or between the source of the MOS transistor and the ground potential.

To an output line, a first MOS transistor can be connected for setting the output line to the power supply potential according to the signal from the internal circuit and a second MOS transistor for setting the output line to the ground potential according to the signal from the internal circuit.

For an input line, a protection resistor can be interposed between a portion where the input line is connected to the punch-through MOS transistor and an input terminal.

According to the I/O protection circuit of the present invention, in order to protect the gate insulating film of the punch-through transistor, which serves as the protection element, a means is provided between the gate and the GND for setting the same potential in a greater time than the punch-through time to alleviate the electric field applied between the gate and the drain of the punch-through transistor relative to the high surge caused by ESD or the like so that the reliability of the gate insulating film can be increased. According to the present invention, an improvement in voltage-proof of about 500 V can be obtained in a test on the basis of MIL standard.

DESCRIPTION OF THE PREFERRED EMBODIMENTS OF THE INVENTION

Several embodiments of the present invention are described hereinafter with reference to the accompanying drawings.

Figure 1:
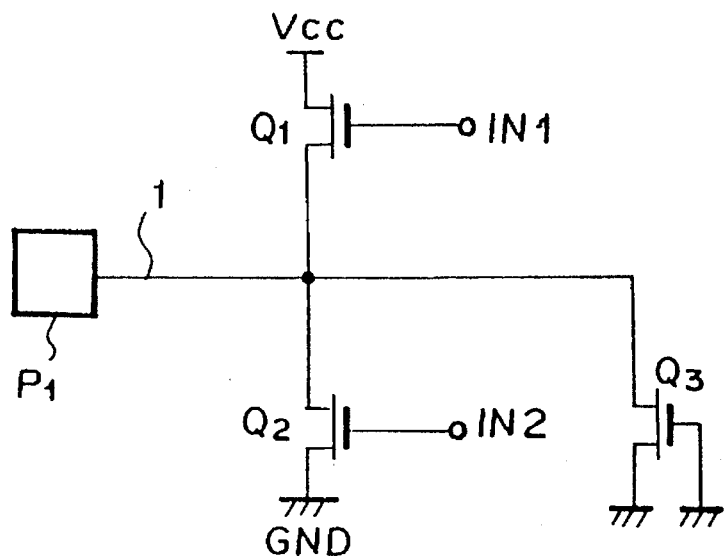
FIG. 1 is a diagram of a conventional output circuit.
Figure 2:
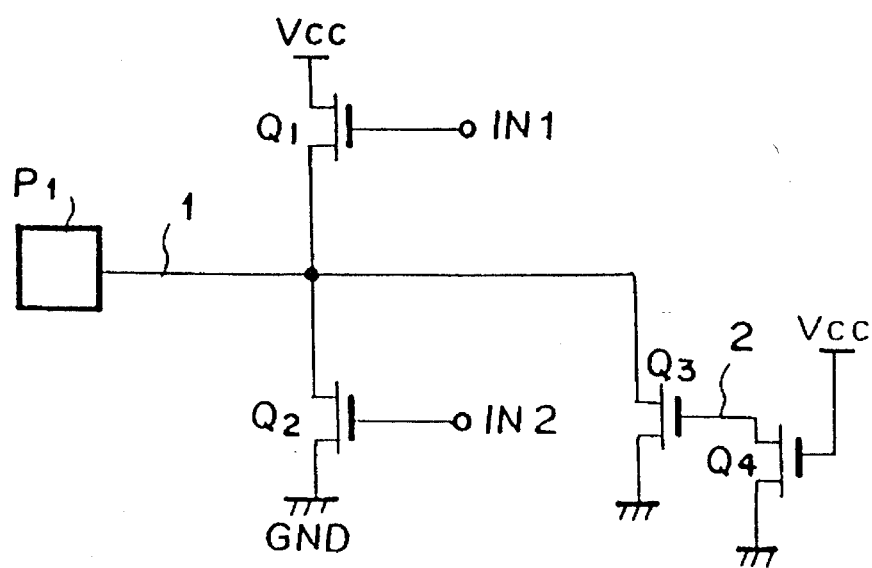
FIG. 2 is a circuit diagram of a first embodiment of the present invention.

FIG. 2 is a circuit diagram of a first embodiment of the present invention, in which $Q_1$, $Q_2$ each denote an output transistor, which, upon receipt of the signals IN1, IN2 from the internal circuit, emits a potential High (Vcc level) or Low (GND level) to the output line 1 while emitting a signal to an output pad $P_1$.

Transistor $Q_3$ is a punch-through N-channel transistor for protecting the transistor $Q_2$, whose drain is connected to the output line 1 and whose source to the GND and whose gate to another N-channel transistor $Q_4$ via a line 2. Further, the source of the transistor $Q_4$ is connected to the GND and the gate to the Vcc.

According to this arrangement, in the normal operating condition, the transistor $Q_4$ is turned ON, the line 2 is turned into the GND level and the transistor $Q_3$ is turned OFF.

However, if, as during ESD, a high surge is instantaneously applied between the output pad $P_1$ and the GND, then the transistor $Q_3$ is punched through to transmit the surge from the line 1 to the GND. However, since the turning-ON speed of this punch-through is faster than the turning-ON speed of the transistor $Q_4$, during the punch-through, the line 2 is not turned into the GND level, but the voltage applied to the gate insulating film of the transistor $Q_3$ is alleviated so that the destruction of the insulating film can be avoided.

The size of the transistor $Q_3$ advisably has a channel width of above 400 μm including that of the transistor $Q_4$ in order to alleviate the current concentration which can be caused during the punch-through. Further, the size of the transistor $Q_4$ may be on the order of 10 μm.

Figure 3:
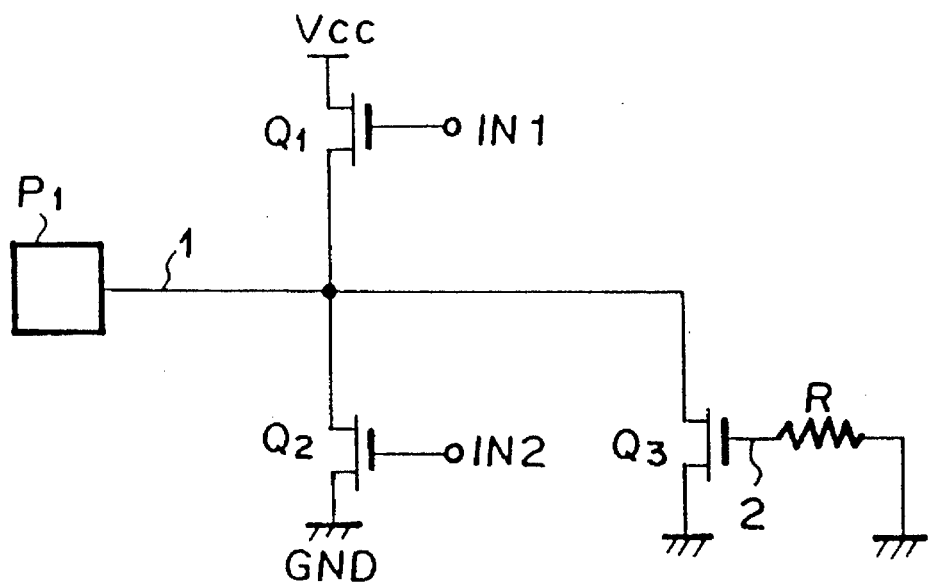
FIG. 3 is a circuit diagram of a second embodiment of the present invention.

FIG. 3 is a circuit diagram of a second embodiment according to the present invention.

In this embodiment, a line node 2 is connected via a resistor R to the GND in place of the transistor $Q_4$ of the first embodiment.

According to this arrangement, in view of a steep surge applied from the output pad $P_1$, the time constant of the resistor R may be made greater than the time when the transistor $Q_3$ suffers a punch-through to prevent application of the voltage between the gate and the drain of the punch-through transistor $Q_3$. Preferably, the resistor R is of above 1 kΩ.

Figure 4:
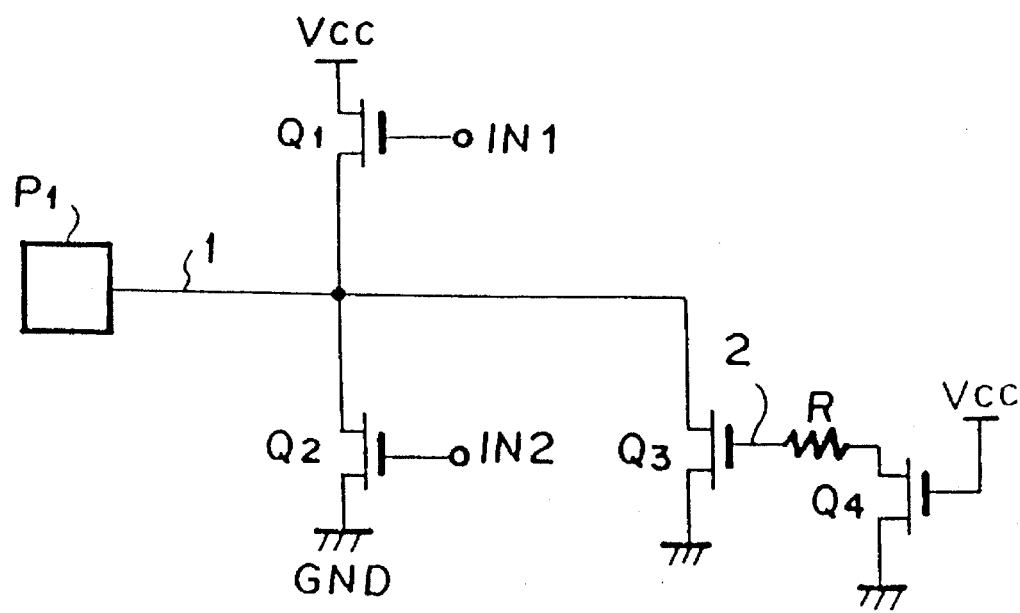
FIG. 4 is a circuit diagram of a third embodiment of the present invention.

FIG. 4 is a circuit diagram of a third embodiment according to the present invention.

In this embodiment, a transistor $Q_4$ is connected via the resistor R to the line node 2.

According to this arrangement, since it takes the time constant of the resistor R plus the turning-ON time of the transistor $Q_4$ for the line node 2 to be turned into the GND level, the time taken until the voltage is applied between the drain and the gate of the transistor $Q_3$ can be made greater to thereby assure a more reliable protection of the gate insulating film.

It is also possible to interpose the resistor R between the transistor $Q_4$ and the GND.

Figure 5:
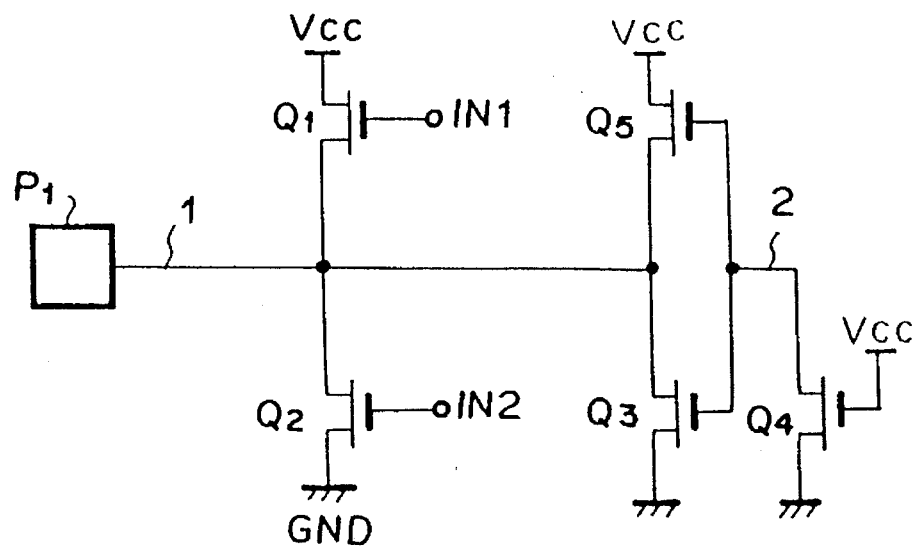
FIG. 5 is a circuit diagram of a fourth embodiment of the present invention.

FIG. 5 is a circuit diagram of a fourth embodiment of the present invention.

In this embodiment, a punch-through transistor $Q_5$ is provided not only at the GND side, but also at the Vcc side.

According to this arrangement, by punching through the surge applied between the output pad $P_1$, and the Vcc by the transistor $Q_5$, the transistor $Q_3$ can be protected.

Figure 6:
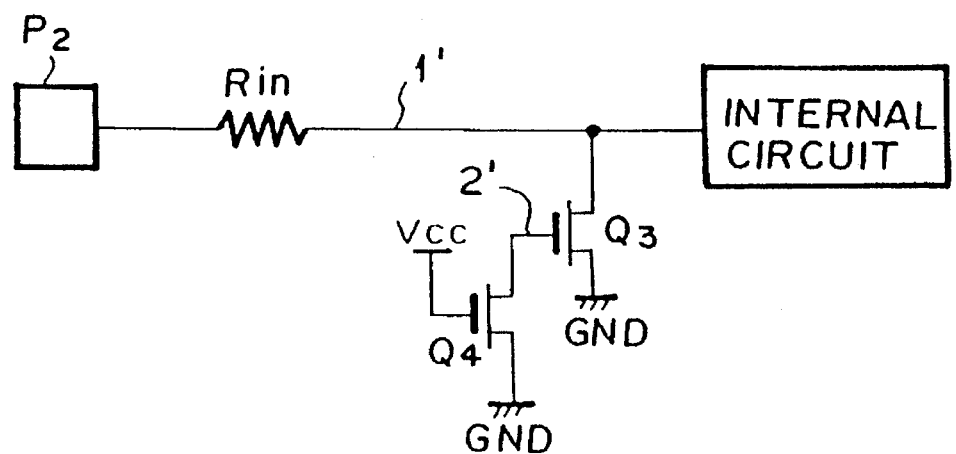
FIG. 6 is a circuit diagram of a fifth embodiment of the present invention.

FIG. 6 is a circuit diagram of a fifth embodiment according to the present invention.

In this embodiment, a transistor $Q_4$ is connected to the gate of the punch-through transistor $Q_3$, which is provided between a line node 1' connected to an input pad $P_2$ and the internal circuit, via a node 2'.

In the input protection circuit, since the input pad $P_2$ is connected to the transistor $Q_3$ via the protection resistor $R_{in}$, the surge applied from the input pad punches through the transistor $Q_3$ after alleviated by the resistor $R_{in}$ to some degree. Therefore the voltage applied between the drain and the gate of the transistor $Q_3$ is not so great as that of the output circuit, and the risk of destruction of the insulating film is also small. According to this embodiment, the reliability against the destruction of the insulating film can be further increased.

What is claimed is:

1. A protection circuit, comprising:
    an output line having an output pad at an output terminal thereof;
    a first output transistor for setting said output line to a potential of a power supply Vcc according to a first signal supplied from an internal circuit, said first output transistor being connected to the power supply Vcc;
    a second output transistor for setting said output line to ground level according to a second signal supplied from the internal circuit, said second output transistor being connected to ground level;
    a first punch-through MOS transistor having a first punch through speed and a drain connected to said output line and a source connected to ground level;
    a second punch-through MOS transistor having a second punch through speed and a drain connected to said output line and a source connected to the power supply Vcc; and
    a grounding MOS transistor for setting both a gate of said first punch-through MOS transistor and a gate of said second punch-through MOS transistor to ground level, said grounding MOS transistor having a drain connected to both said gate of said first punch-through MOS transistor and said gate of said second punch-through MOS transistor, a source of said grounding MOS transistor being connected to ground level, and a gate of said grounding MOS transistor being connected to the power supply Vcc, said grounding MOS transistor having an operating speed slower than said first punch-through speed of said first punch-through MOS transistor and slower than said second punch-through speed of said second punch-through MOS transistor.

2. A protection circuit as in claim 1, wherein said first output transistor comprises a MOS transistor having a source connected to the power supply Vcc, a drain connected to said output line and a gate connected to a terminal for supplying the first signal of said internal circuit, and, said second output transistor comprises a MOS transistor having a source connected to ground level, a drain connected to said output line and a gate connected to a terminal for supplying the second signal of said internal circuit.

3. A protection circuit as in claim 1, wherein the punch-through speeds of said first and second punch-through MOS transistors are different.

* * * * *